(12) United States Patent
Masuda

(10) Patent No.: US 6,173,397 B1
(45) Date of Patent: Jan. 9, 2001

(54) PROCESSING APPARATUS AND AN OPERATION CONTROL INFORMATION UPDATE SYSTEM EMPLOYING THE PROCESSING APPARATUS

(75) Inventor: Takeshi Masuda, Wakayama (JP)

(73) Assignee: Noritsu Koki Co., Ltd., Wakayama-ken (JP)

(*) Notice: Under 35 U.S.C. 154(b), the term of this patent shall be extended for 0 days.

(21) Appl. No.: 09/159,967

(22) Filed: Sep. 24, 1998

(30) Foreign Application Priority Data

Sep. 26, 1997 (JP) .................................. 9-262532

(51) Int. Cl.⁷ ........................................ G06F 9/00
(52) U.S. Cl. .............................. 713/1; 713/100
(58) Field of Search ........................ 713/100–166, 713/1, 2

(56) References Cited

U.S. PATENT DOCUMENTS 5,530,862 * 6/1996 Wadsworth et al. .................... 713/1
5,579,522 * 11/1996 Christeson et al. ..................... 713/2
5,657,448 * 8/1997 Wadsworth et al. .................. 709/220
5,732,275 * 3/1998 Kullick et al. ....................... 395/712
5,794,033 * 8/1998 Aldebert et al. ..................... 713/100
5,812,857 * 9/1998 Nelson et al. ...................... 395/712
6,014,691 * 1/2000 Brewer et al. ...................... 709/217

* cited by examiner

Primary Examiner—Dennis M. Butler
(74) Attorney, Agent, or Firm—Jordan and Hamburg LLP

(57) ABSTRACT

A photographic processing machine comprises a machine control block and an information control block, in which the photographic processing machine performs a specified operation in accordance with operation control information stored in EEPROMs of the machine control block, and the information control block includes a RAM for holding operation control information transmitted from a system control center and an information updater for updating the operation control information currently stored in the EEPROMs by transferring the operation control information taken into the RAM to the EEPROMs.

20 Claims, 10 Drawing Sheets

PROCESSING APPARATUS AND AN OPERATION CONTROL INFORMATION UPDATE SYSTEM EMPLOYING THE PROCESSING APPARATUS

BACKGROUND OF THE INVENTION AND RELATED ART STATEMENT

The present invention relates to a processing apparatus which performs a specified operation in accordance with operation control information, such as a processing program and data, stored in a memory as well as to an operation control information update system employing the processing apparatus.

The use of photographic processing machines in which film images, for instance, are automatically printed on photographic printing paper is widespread in recent years. In this kind of photographic processing machine, operational processes of individual processing segments, such as an exposure processor and a development processor, axe controlled based on a processing program and data (hereinafter referred to as operation control information) which are stored in a memory in carrying out exposure, development and other processing steps. The operation control information stored in the memory is updated when the processing program has been upgraded or when the need arises to do so for other reasons whatsoever. Conventionally when the need arises to update the operation control information, service personnel visit each of their customers carrying a floppy disk on which an upgrade version of the operation control information is written, load the disk in a floppy disk drive of the photographic processing machine, and update the previously stored operation control information overwriting it with the new operation control information read out from the disk One problem of this conventional method is that the customers can not use their photographic processing machines while the operation control information including the processing program and data is being updated. It has therefore been necessary for the service personnel to visit their customers during time periods specified by the individual customers, and this has considerably decreased labor efficiency in updating the operation control information. Another problem is that locations of the customers are usually distant from one another, making it necessary for the service personnel to spend much time in moving from one customer to another Accordingly the number of machines handled by the service personnel in a given period of time is limited. This also has contributed to deterioration of labor efficiency in updating the operation control information. Such problems would be encountered not only with the photographic processing machines but with other processing apparatus which perform a specified operation in accordance with operation control information stored in a memory.

SUMMARY OF THE INVENTION

It is an object of the invention to provide a processing apparatus which makes it possible to update operation control information stored in a memory in an efficient manner and an operation control information update system employing such processing apparatus.

According to one important aspect of the invention, a processing apparatus comprises an apparatus controller which includes a control information memory for storing operation control information, enabling the processing apparatus to perform a specified operation and an information controller which includes an update information memory for holding operation control information transmitted from a control center and an information updater for updating the operation control information currently stored in the control information memory by transferring the operation control information held in the update information memory to the control information memory.

In the processing apparatus thus constructed, the operation control information including a processing program and associated data received from the control center is, temporarily stored in the update information memory of the information controller. The operation control information thus stored in the update information memory is transferred to the control information memory of the apparatus controller by the information updater to thereby update the operation control information previously stored in the control information memory.

According to another aspect of the invention, the information updater may be set to transfer the operation control information taken into the update information memory to the control information memory on condition that transmission of the operation control information from the control center has been completed.

In this construction, the information updater begins to transfer the operation control information taken into the update information memory at the end of transmission from the control center. The expression end of transmission above does not necessarily refer to the completion of transmitting the whole operation control information, but it implies a situation in which a certain amount of information that corresponds to the storage capacity of the update information memory, or any predefined amount of information, has just been transmitted. In this latter case, when transmission of the predefined amount, or portion, of the operation control information has been completed, that portion of the operation control information is transferred to the control information memory and, then, each successive portion of the operation control information is taken into the update information memory and transferred to the control information memory until the whole operation control information is transferred to the control information memory.

According to still another aspect of the invention, the information updater may be set to transfer the operation control information taken into the update information memory to the control information memory on condition that a prescribed prerequisite for information updating has been satisfied.

With this arrangement, the operation control information taken into the update information memory is transferred to only when the prescribed prerequisite for information updating has been satisfied.

According to yet another aspect of the invention, the processing apparatus may further comprise a power supply for providing electric power to the processing apparatus and the aforementioned prerequisite for information updating is that the power supply has been activated.

In this construction, the information updater begins to transfer the operation control information taken into the update information memory to the control information memory when the power supply which provides electric power to the whole processing apparatus has been activated by turning on a power switch of the processing apparatus, or when processing apparatus has been started up.

According to a further aspect of the invention, the aforementioned prerequisite for information updating may be a transfer command given by an operator. With this arrangement, the information updater begins to transfer the operation control information taken into the update information memory to the control information memory when the operator gives a transfer command by turning on a transfer start switch, for example.

According to a still further aspect of the invention, the processing apparatus may further comprise a writing device for writing operation control information on an external storage medium loaded in the processing apparatus and the aforementioned prerequisite for information updating is that the writing device has become ready to write on the external storage medium.

In this construction, the information updater begins to transfer the operation control information taken into the update information memory to the control information memory when an external storage medium, such as a floppy disk, has been loaded and the writing device has become ready to write on the external storage medium. The operation control information thus updated is copied onto the external storage medium.

According to a further aspect of the invention, the aforementioned prerequisite for information updating may be that the operation control information is not stored in the control information memory.

In this arrangement, the information updater begins to transfer the operation control information taken into the update information memory to the control information memory in response to an information request signal, for instance, which would be generated when the control information memory been replaced and it does not store the correct operation control information, or any operation control information at all, necessary for controlling the processing apparatus.

According to a further aspect of the invention, the processing apparatus may further comprise a display unit for displaying information on the operation control information taken into the update information memory.
In this construction, information on the operation control information received from the control center, such as changes to the existing operation control information, is displayed on the display unit. This allows the operator to decide whether or not to update the operation control information after verifying the contents of changes displayed on the display unit.

According to a still further aspect of the invention, the processing apparatus may further comprise an update enabling device for enabling transfer of the operation control information taken into the update information memory and displayed on the display unit to the control information memory.

In this arrangement, the operation control information taken into the update information memory is transferred to the control information memory only when the update enabling device has been operated. This allows the operator to update the operation control information only when he, or she, thinks it is necessary to do so after verifying the contents of changes to the current operation control information displayed on the display unit.

According to another important aspect of the invention, an operation control information update system comprises an operation control information transmitting apparatus for transmitting an operation control information: and a processing apparatus for receiving the operation control information from the operation control information transmitting apparatus The processing apparatus includes an apparatus controller and an information controller. The apparatus controller has a control information memory for storing the operation control information, enabling the processing apparatus to perform a specified operation and the information controller having an update information memory for holding the operation control information transmitted from the operation control information transmitting apparatus and an information updater for updating the operation control information currently stored in the control information memory by transferring the operation control information held in the update information memory to the control information memory.

In this arrangement, the operation control information including a processing program and associated data, for instance, is transmitted from the operation control information transmitting apparatus and received by the processing apparatus. The operation control information received by the processing apparatus is once stored in the update information memory of the information controller and transferred to the control information memory of the apparatus controller to thereby update the operation control information previously stored in the control information memory.

It will be appreciated that the invention permits efficient updating of the operation control information stored in the control information memory.

These and other objects, features and advantages of the invention will be more fully understood upon reading the following detailed description in conjunction with the accompanying drawings.

DETAILED DESCRIPTION OF THE PREFERRED EMBODIMENTS OF THE INVENTION

Figure 1:
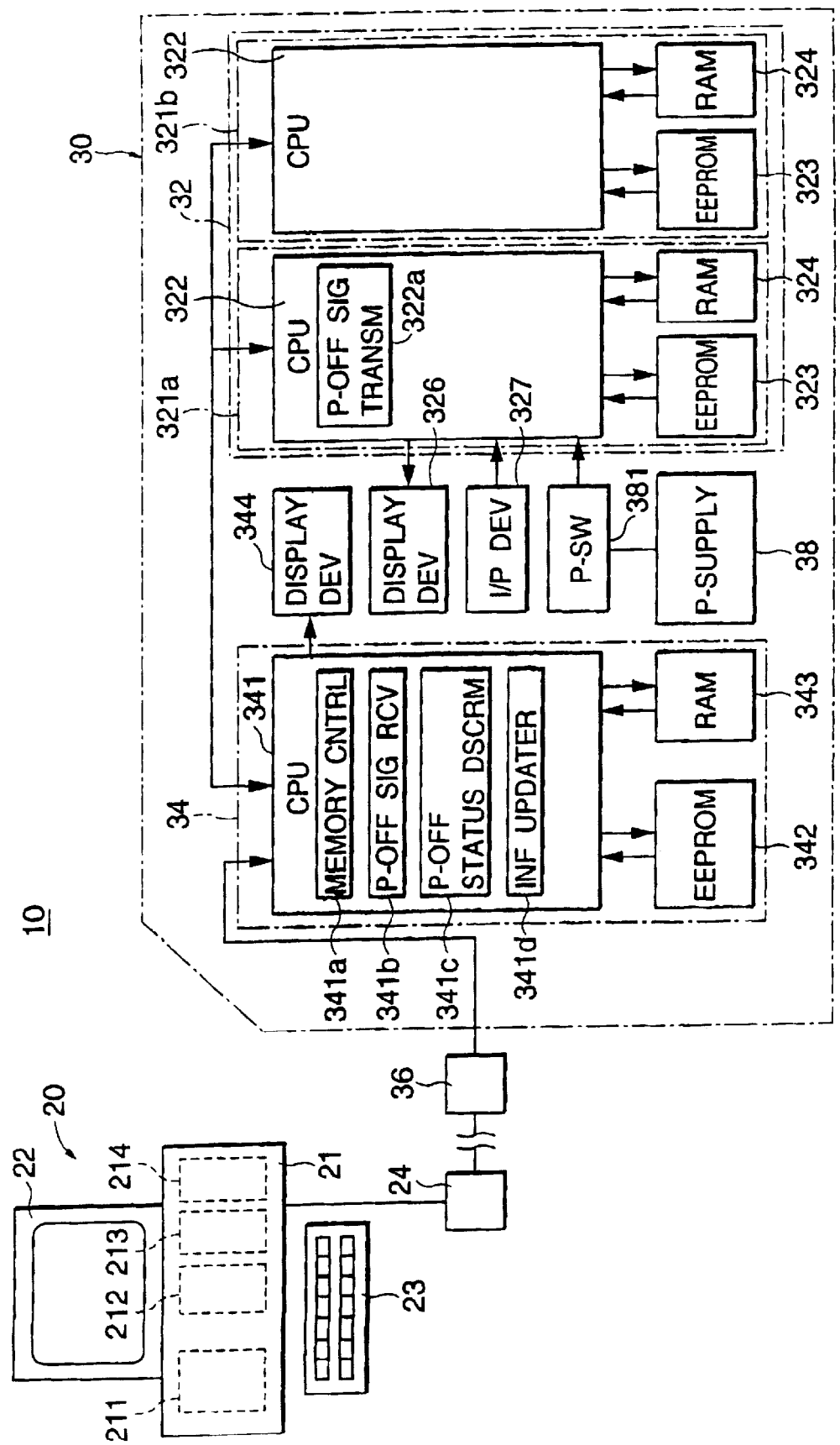
FIG. 1 is a block diagram generally showing the configuration of an operation control information update system employing a processing apparatus according to a first embodiment of invention.

FIG. 1 is a diagram generally showing the configuration of an operation control information update system 10 employing a processing apparatus according to a first embodiment of the invention. The operation control information update system 10 of this embodiment is constructed such that operation control information including a processing program and associated data can be transmitted from a system control center to the processing apparatus through a communication line and loaded into the processing apparatus, automatically updating existing operation control information when the processing apparatus is not operated, during nighttime hours, for example.

Specifically, the operation control information update system 10 comprises an operation control information transmitting apparatus 20, such as a personal computer, provided in the system control center and a photographic processing machine 30 which serves as a receiving station that is connected to the operation control information transmitting apparatus 20 by a communication line TL and provided in a photographic processing shop, for instance.

The operation control information transmitting apparatus 20 comprises a control unit 21, a display unit 22 including a cathode ray tube (hereinafter referred to as CRT), for instance, a keyboard 23 and a modem 24. The operation control information transmitting apparatus 20 thus constructed transmits an upgrade version of operation control information, which differs from the currently used operation control information, to the operation control information transmitting apparatus 20 for updating the operation control information previously stored in control information memories of a machine control block 32.

The control unit 21 includes a data reading device 211 for reading data stored on an external storage medium, such as a floppy disk, a data processor 212 which performs a specified signal processing operation on the data read out by the data reading device 211, a data storage 213 for storing data obtained through the signal processing operation performed by the data processor 212 or entered through the keyboard 23, and a controller 214 for controlling overall operation of the operation control information transmitting apparatus 20.

The display unit 22 displays the contents of data transmission condition settings and a message to be transmitted to the photographic processing machine 30 while the keyboard 23 permits entry of various data including the data transmission conditions and message to be transmitted to the photographic processing machine 30. The modem 24 converts data from digital form to analog form, and vice versa. More specifically, the modem 24 converts digital data stored in the controller 214 into analog data, and analog data transmitted from the photographic processing machine 30 into digital data.

The photographic processing machine 30 comprises an exposure processor and a development processor which are not illustrated. Photographic printing paper is exposed with images recorded on a film, for instance, in the exposure processor and the exposed photographic printing paper is developed in the development processor. The photographic processing machine 30 further comprises the aforementioned machine control block 32 and an information control block 34 and is connected to the operation control information transmitting apparatus 20 via an external modem 36.

The machine control block 32 controls operational processes of individual processing segments including the aforementioned exposure processor and the development processor. In this embodiment, the machine control block 32 includes a first controller 321a and a second controller 321b. The first and second controllers 321a. 321b each include a central processing unit (hereinafter referred to as CPU) 322 which performs a specified processing operation, an electrically erasable programmable read-only memory (hereinafter referred to as EEPROM) 323 which constitutes a control information memory for storing a specific processing program, and a random-access memory (hereinafter referred to as RAM) 324 for temporarily storing processing data. Each EEPROM 823 is a read-only memory of which contents can be electrically rewritten. As shown in FIG. 1, a display device 326 for displaying the contents of the operation control information and processing condition settings stored in the EEPROMs 323, an input device 327, such as a keyboard, and a power switch 381 used for turning on and off a power supply 38 which supplies electric power to the exposure processor and other processing segments are connected to the first controller 321a. The CPU 322 of the first controller 321a incorporates the function of a power-off signal transmitter 322a which transmits a power-off signal when the power switch 381 is turned off.

The information control block 34 once stores the operation control information transmitted from the operation control information transmitting apparatus 20 and transfers it to the machine control block 32. To perform this function, the information control block 34 includes a CPU 341 which performs a specified processing operation, an EEPROM 342 storing a specific processing program, and a RAM 343 which constitutes an information memory for temporarily storing the operation control information received from the operation control information transmitting apparatus 20.

A display device 344 for displaying messages concerning the operation control information stored in the RAM 343, such as changes from the previous version of the operation control information, are connected to the information control block 34. The CPU 341 incorporates several functional elements including a memory controller 341a which causes the RAM 343 to temporarily store the operation control information when it has been received from the operation control information transmitting apparatus 20. a power-off signal receiver 341b which receives the power-off signal fed from the power-off signal transmitter 322a, a power-off status discriminator 341c which judges whether the photographic processing machine 30 is in an operating or non-operating condition (that is, whether the power-off signal transmitted by the power-off signal transmitter 322a' has been received), and an information updater 341d which transfers the operation control information written in the RAM 343 to the EEPROMs 323 of the machine control block 32 and updates the operation control information stored in the EEPROMs 323.

The memory controller 341a functions also as an information discriminator for sensing whether the operation control information has been written into the RAM 343, while the information updater 341d functions also as a data transfer controller for issuing a command to transfer the operation control information written in the RAM 343 to the EEPROMs 323 of the machine control block 32 as well as an immediate update discriminator for judging whether an immediate update request requiring immediate updating of the operation control information is present.

The EEPROM 342 is, like the EEPROMs 323 of the machine control block 32, a read-only memory of which contents can be electrically rewritten. The RAM 343 has a first storage area for temporarily storing the processing program to be written into the EEPROMs 323 of the machine control block 32, a second storage area for temporarily storing data to be written into the EEPROMs 323 of the machine control block 32, a third storage area for temporarily storing the processing program to be written into the EEPROM 342 of the information control block 34, and a fourth storage area for temporarily storing data.

The modem 36 converts data from digital form to analog form, and vice versa. More specifically, the modem 36 converts analog data transmitted from the operation control information transmitting apparatus 20 into digital data, and digital data to be transmitted to the operation control information transmitting apparatus 20 into analog data.

Operation of the operation control information update system 10 thus constructed is now described with reference to the flowchart of FIG. 2.

When the power switch 381 connected to the power supply 38 is turned off at the end of working hours, for instance, the power-off signal transmitter 322a transmits a power-off signal to the information control block 34. The power-off signal is received by the power-off signal receiver 341b of the information control block 34 and stored in the RAM 343 and then, the photographic processing machine 30 is set to a ready-to-receive state waiting for any incoming data with a nighttime timer working.

Figure 2:
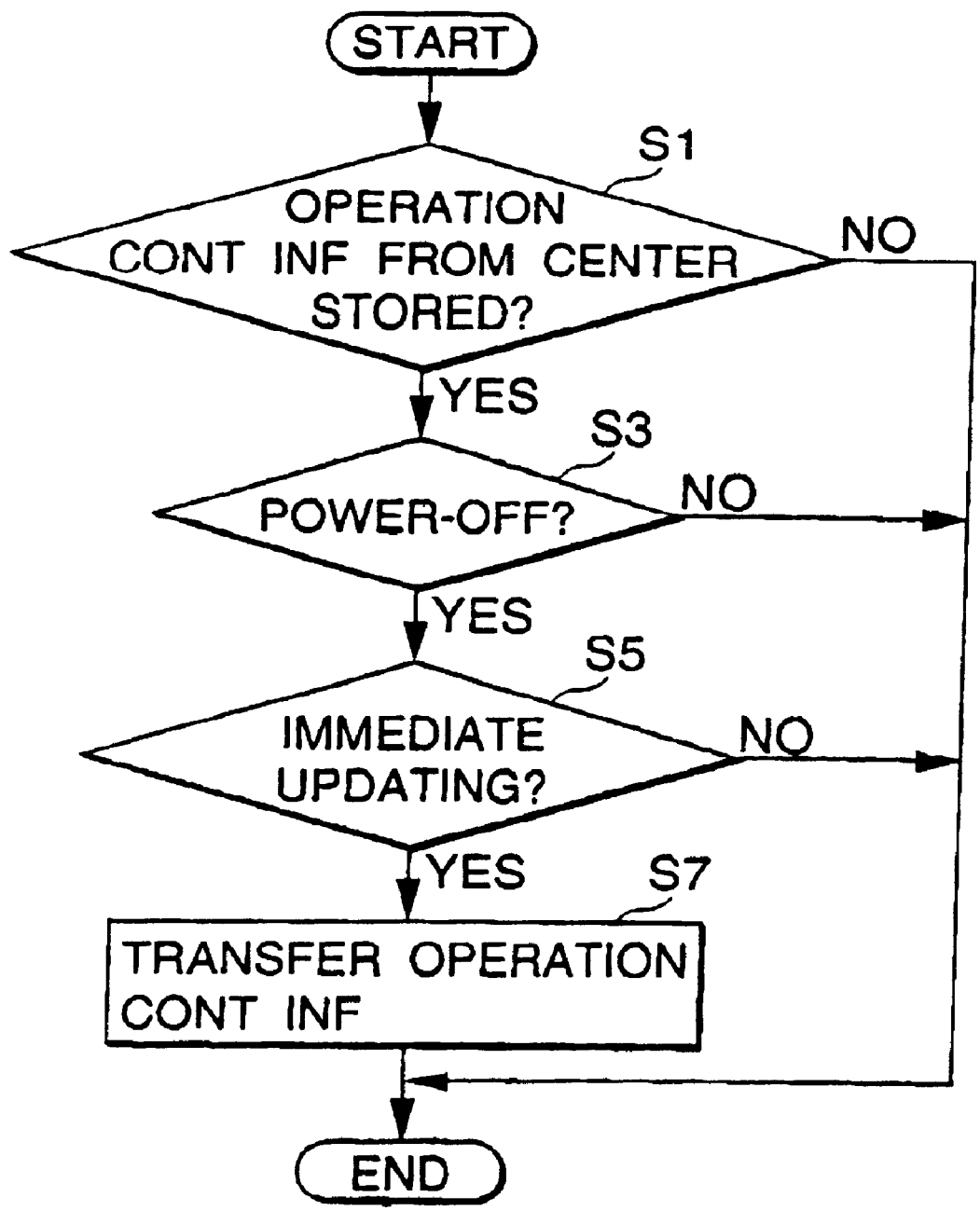
FIG. 2 is a flowchart depicting the operation of the processing apparatus employed in the operation control information update system of FIG. 1.

Referring to FIG. 2, it is judged whether any operation control information transmitted from the operation control information transmitting apparatus 20 in the system control center has been written into the RAM 343 of the information control block 34 (step S1). If it is judged that the operation control information has been written into the RAM 343 (Yes in step S1), a further judgment is made as to whether the photographic processing machine 30 is in a power-off state (step S3). This judgment is intended to ensure that the operation control information is updated only if the photographic processing machine 30 is in its non-operating condition, because normal processing operation of the photographic processing machine 30 will be disturbed if the operation control information already existing in the machine control block 32 is updated while the photographic processing machine 30 is being operated.

If it is judged that the photographic processing machine 30 is in the power-off state (Yes in step S3), it is further judged whether an immediate update request requiring immediate updating of the operation control information is present (step S5). If the judgment result is in the affirmative (Yes in step S5), the operation control information written in the RAM 343 is transferred to the individual EEPROMs 323 of the machine control block 32 immediately when transmission from the operation control information transmitting apparatus 20 has been completed (step S7).

The aforementioned immediate update request may be given in the form of a command transmitted from the operation control information transmitting apparatus 20 as part of the operation control information. Alternatively the processing program stored in the EEPROM 342 of the information control block 34 may contain a routine to issue a similar command which causes the information updater 341d to transfer the operation control information immediately at the end of transmission from the operation control information transmitting apparatus 20 has been completed.

The expression "end of transmission" used above does not necessarily refer to the completion of transmitting the whole operation control information. It should be understood that the expression also implies a situation in which a certain amount of information that corresponds to the storage capacity of the RAM 343, or any predefined amount of information, has just been transmitted. In this latter case, when transmission of the predefined amount, or portion, of the operation control information has been completed, that portion of the operation control information is transferred to the EEPROMs 323 and, then, each successive portion of the operation control information is taken into the RAM 343 and transferred to the EEPROMs 323 until the whole operation control information is transferred to the EEPROMs 323.

It is possible to update the operation control information stored in the EEPROMs 323 of the machine control block 32 in an efficient manner in the operation control information update system 10 of the first embodiment described above since the current operation control information is updated by transmitting the upgrade version of the operation control information from the system control center to the photographic processing machine 30 as described above. When the operation control information previously stored in the EEPROMs 323 of the machine control block 32 has been updated in this way, operation of the photographic processing machine 30 is controlled in accordance with the upgrade version of the operation control information.

It would be recognized from the foregoing discussion that the above-described first embodiment permits automatic updating of the operation control information after the power switch 381 has been turned off. The embodiment may be varied such that the operation control information is updated only when it is necessary to do so. This will be achieved by providing an update enabling device including an enable switch which enables transfer of the upgrade version of the operation control information stored in the RAM 343 on the input device 327, for example. This arrangement would allow an operator of the photographic processing machine 30 to verify the contents of changes to the current operation control information by displaying the same on the display device 344 of the information control block 34 and press the enable switch only when it is considered necessary to update the operation control information.

The above-described first embodiment may be varied such that various data stored in the EEPROMs 323 and the RAMs 324 of the first and second controllers 321a, 321b of the machine control block 32 are transferred to and stored in the RAM 343 of the information control block 34 when the power switch 381 is turned off, for example. This varied form of the first embodiment makes it possible to restore the photographic processing machine 30 to its original condition in case information stored in photographic processing machine 30 is destroyed by an operational error. This variation may be applied to other embodiments of the invention which will be described later.

Although the operation control information is transmitted from the operation control information transmitting apparatus 20 to the photographic processing machine 30 through the communication line TL in the above-described first embodiment, the information may be transmitted through a radio communication link. In this varied form of the first embodiment, the operation control information transmitting apparatus 20 and the photographic processing machine 30 are provided with their respective radio communications terminals. This variation is applicable also to the other embodiments to be described later.

The aforementioned first embodiment may be varied such that the operation control information is compressed in the operation control information transmitting apparatus 20 before it is transmitted to the photographic processing machine 30. This will make it possible to decrease the storage capacity of the RAM 343 of the information control block 34 and the time required for transmitting the operation control information. This variation is applicable also to the other embodiments to be described later. When the operation control information is compressed in the operation control information transmitting apparatus 20, the photographic processing machine 30 should be provided with means for expanding the compressed operation control information once stored in the RAM 343 when the operation control information is transferred to the machine control block 32.

The aforementioned first embodiment may also be varied such that the processing program stored in the EEPROM 342 of the information control block 34 is also updated. While the machine control block 32 of the first embodiment includes the first controller 321a and the second controller 321b, it may becomes necessary to update the processing program stored in the EEPROM 342 if the number of controllers incorporated in the machine control block 32 increases. In such a case, it would be possible to update the processing program stored in the EEPROM 342 in a manner similar to the updating of the operation control information for the machine control block 32. This variation is applicable also to the other embodiments to be described later.

Figure 3:
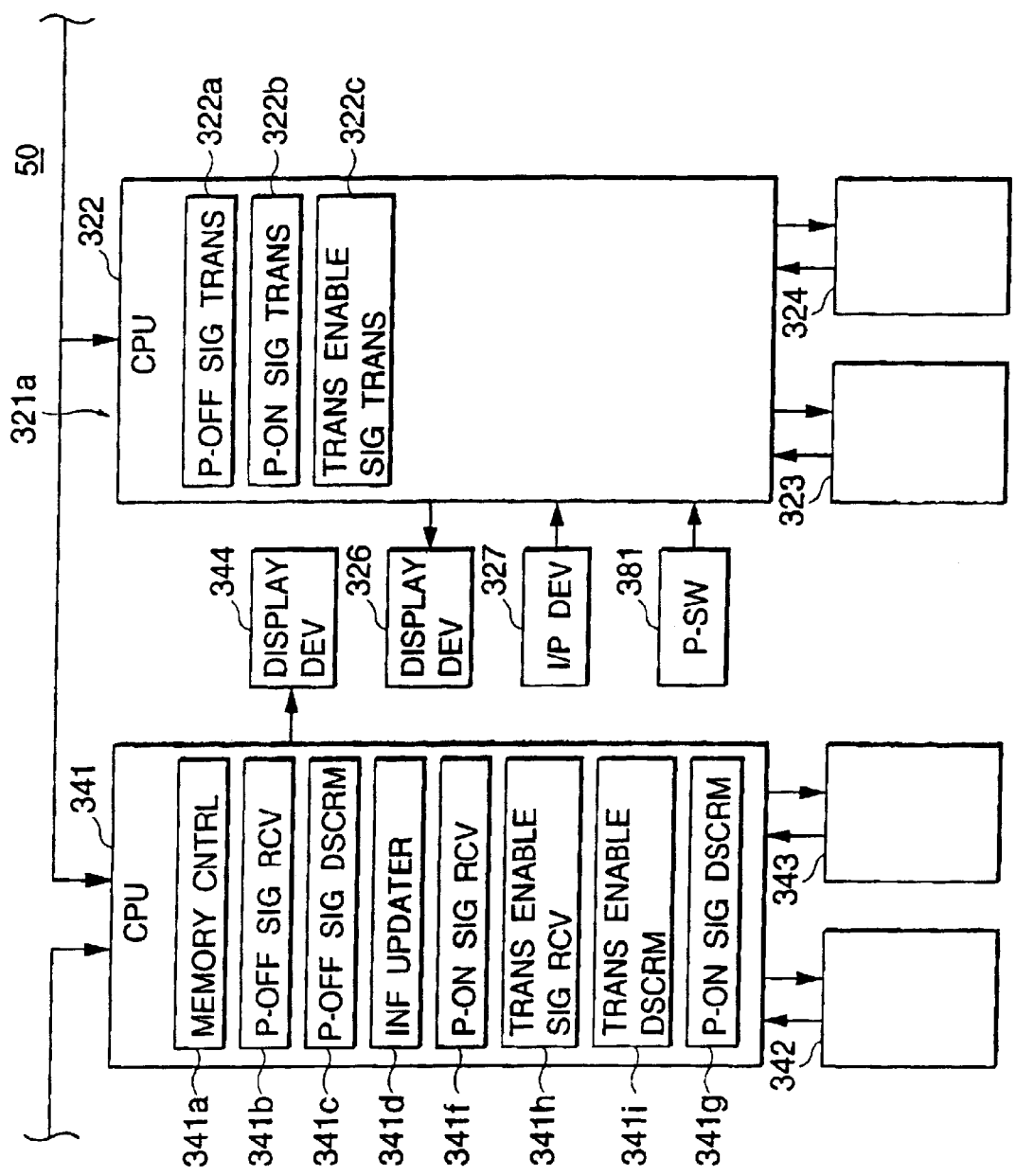
FIG. 3 is a block diagram showing part of an operation control information update system employing a processing apparatus according to a second embodiment of the invention.

FIG. 3 is a block diagram showing part of an operation control information update system 50 employing a processing apparatus (photographic processing machine 30) according to a second embodiment of the invention, in which elements identical or equivalent to those included in the operation control information update system 10 of the first embodiment are designated by the same reference numerals and a detailed description of such elements is omitted.

What is characteristic of the operation control information update system 50 of the second embodiment is that the operation control information is updated by transferring its upgrade version which has been transmitted from the system control center and stored in a RAM 343 of an information control block 34 to a machine control block 32 when the photographic processing machine 30 is started from its non-operating condition by turning on a power switch 381 of a power supply 38.

In this operation control information update system 50, a CPU 322 of a first controller 321a incorporates, besides the function of the earlier-described power-off signal transmitter 322, additional functional elements including a power-on signal transmitter 322b which transmits a power-on signal when the power switch 381 is turned on, and a transfer enable signal transmitter 322c which transmits a transfer enable signal for enabling transfer of the operation control information from the information control block 34 to the machine control block 32 when a particular key of an input device 327 is pressed.

On the other hand, a CPU 341 of the information control block 34 incorporates, besides the functions of the earlier-described memory controller 341a, power-off signal receiver 341b, power-off status discriminator 341c and information updater 341d, some additional functional elements including a power-on signal receiver 341f which receives the power-on signal fed from the power-off signal transmitter 322b, a power-on signal discriminator 341g which judges whether the power-on signal transmitted by the power-off signal transmitter 322b has been received, a transfer enable signal receiver 341h which receives the transfer enable signal fed from the transfer enable signal transmitter 322c, and a transfer enable discriminator 341i which judges whether the transfer enable signal has been received.

Operation of the operation control information update system 50 thus constructed is now described with reference to the flowchart of FIG. 4.

When the power switch 381 connected to the power supply 38 is turned off at the end of working hours, for instance, the photographic processing machine 30 is set to a ready-to-receive state waiting for any incoming data with a nighttime timer working in the same way as the first embodiment.

Figure 4:
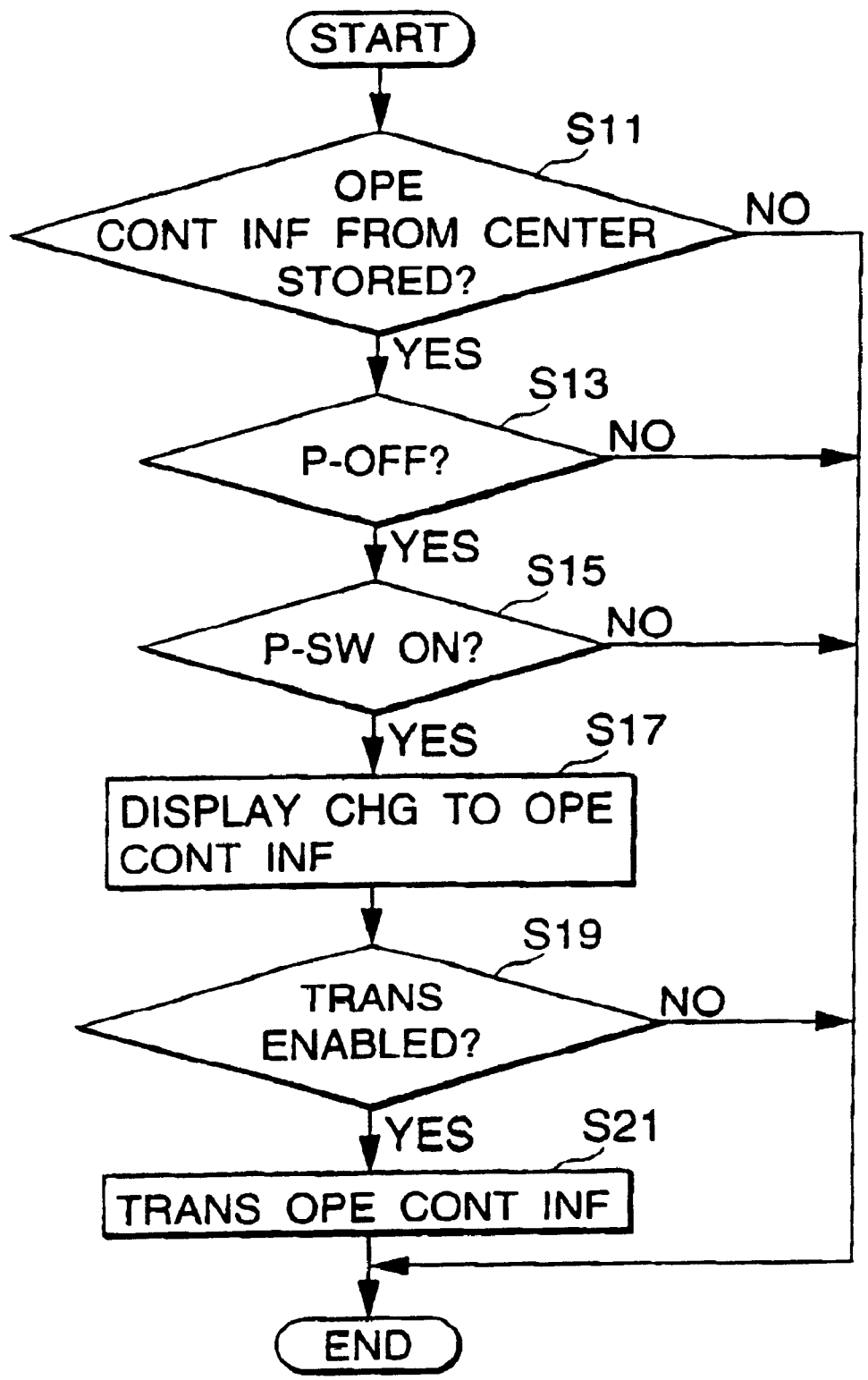
FIG. 4 is a flowchart depicting the operation of the processing apparatus employed the operation control information update system of FIG. 3.

Referring to FIG. 4, it is judged whether any operation control information transmitted from the operation control information transmitting apparatus 20 in the system control center has been written into the RAM 343 of the information control block 34 (step S11). If it is judged that the operation control information has been written into the RAM 343 (Yes in step S11), a further judgment is made as to whether the photographic processing machine 30 is in a power-off state (step S13). This step is intended to ensure that the operation control information is not inadvertently updated while the photographic processing machine 30 is being operated.

If it is judged that the photographic processing machine 30 is in the power-off state (Yes in step S13), it is further judged whether the power switch 381 has been turned on (step S15). If it is judged that the power switch 381 has been turned on (Yes in step S15), a message concerning the operation control information written in the RAM 343, such as changes from the previous version of the operation control information, is displayed on a display device 344 (step S17).

Next, it is judged whether the transfer enable signal has been transmitted (step S19). The transfer enable signal is generated when the operator, who has decided to update the operation control information after verifying the message displayed on the display device 344, presses a specified key of the input device 327. If it is judged that transfer of the operation control information has been enabled (Yes in step S19), the operation control information written in the RAM 343 is transferred to individual EEPROMs 323 of the machine control block 32 (step S21).

It is possible to update the operation control information stored in the EEPROMs 323 of the machine control block 32 in an efficient manner in the operation control information update system 50 of the second embodiment described above since the existing operation control information is updated by transmitting the upgrade version of the operation control information from the system control center to the photographic processing machine 30 in a manner similar to the first embodiment. In this embodiment, the operator can choose not to update the operation control information if he, or she, thinks it is not necessary to do so. This is because the operator enables transfer of the new operation control information after verifying the contents of changes to the existing operation control information displayed on the display device 344.

Although the operation flow of the second embodiment described above includes the step of judging the photographic processing machine 30 is in its non-operating condition, this step is not necessarily required. Further, although the display device 344 is made operational after the power switch 381 has been turned on in this embodiment, it may be varied such that the display device 344 is powered on immediately when transmission the operation control information from the operation control information transmitting apparatus 20 has been completed, for example. These variations are applicable to the later-described embodiments as well.

Figure 5:
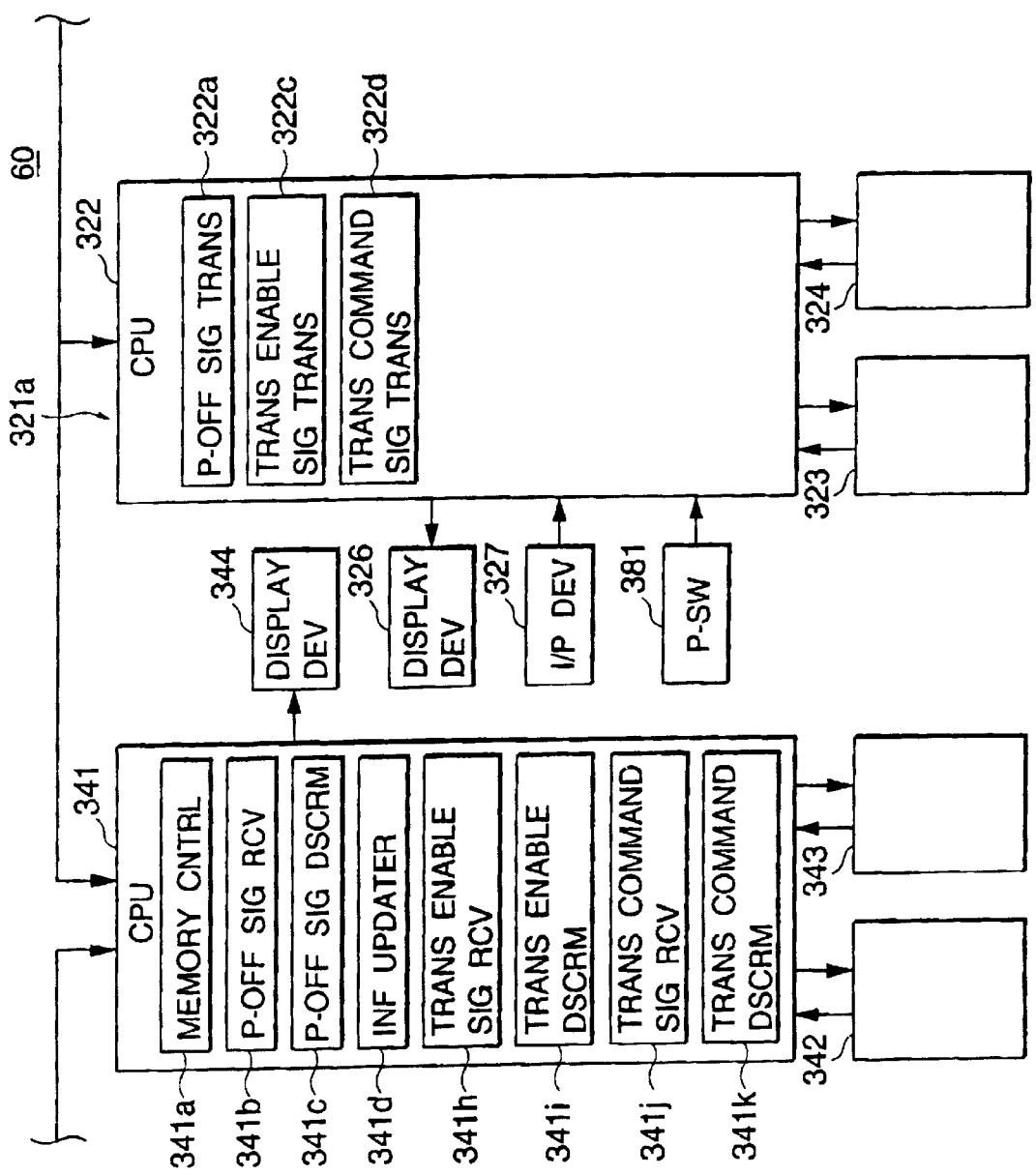
FIG. 5 is a block diagram showing part of an operation control information update system employing a processing apparatus according to a third embodiment of the invention.

FIG. 5 is a block diagram showing part of an operation control information update system 60 employing a processing apparatus (photographic processing machine 30) according to a third embodiment of the invention, in which elements identical or equivalent to those included in the operation control information update system 10 of the first embodiment are designated by the same reference numerals and a detailed description of such elements is omitted.

What is characteristic of the operation control information update system 60 of the second embodiment is that the operation control information is updated by transferring its upgrade version which has been stored in a RAM 343 of an information control block 34 to a machine control block 32 when the operator gives an instruction to start transfer of the information by pressing a particular key of an input device 327, for example.

In this operation control information update system 60, a CPU 322 of a first controller 321a incorporates, besides the functions of the earlier-described power-off signal transmitter 322a and transfer enable signal transmitter 322c, an additional function as a transfer command signal transmitter 322d which transmits a transfer command signal requesting a transfer of the operation control information from the information control block 34 to the machine control block 32 when a particular key of the input device 327 is pressed.

On the other hand, a CPU 341 of the information control block 34 incorporates, besides the functions of the earlier-described memory controller 341a, power-off signal receiver 341b, power-off status discriminator 341c, information updater 341d, transfer enable signal receiver 341h and transfer enable discriminator 341i, additional functions as a transfer command signal receiver 341j which receives the transfer command signal fed from the transfer command signal transmitter 322d and as a transfer command discriminator 341k which judges whether the transfer command signal has been received.

Operation of the operation control information update system 60 thus constructed is now described with reference to the flowchart of FIG. 6. When a power switch 381 connected to the power supply 38 is turned off at the end of working hours, for instance, the photographic processing machine 30 is set to a ready-to-receive state waiting for any incoming data with a nighttime timer working in the same way as the first embodiment.

Figure 6:
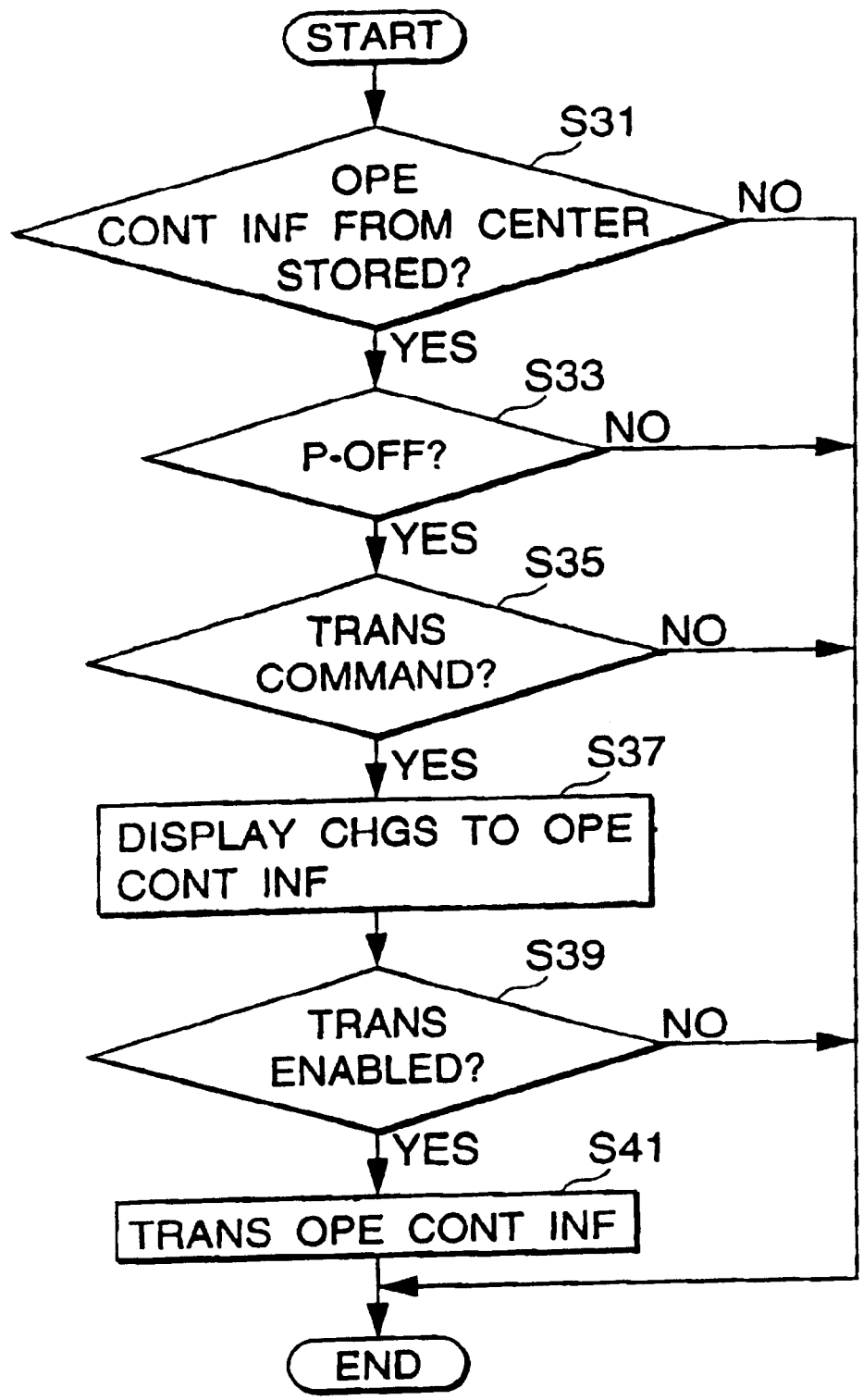
FIG. 6 is a flowchart depicting the operation of the processing apparatus employed in the operation control information update system of FIG. 5.

Referring to FIG. 6, it is judged whether any operation control information transmitted from the operation control information transmitting apparatus 20 in the system control center has been written into the RAM 343 of the information control block 34 (step S31). If it is judged that the operation control information has been written into the RAM 343 (Yes in step S31), a further judgment is made as to whether the photographic processing machine 30 is in a power-off state (step S33). This step is intended to ensure that the operation control information is not inadvertently updated while the photographic processing machine 30 is being operated.

If it is judged that the photographic processing machine 30 is in the power-off state (Yes in step S33), it is further judged whether a transfer command has been issued (step S35). The transfer command is generated when the operator presses a specified key of the input device 327. Alternatively, a transfer command may be entered by selecting "TRANSFER" on a menu displayed on a display device 326, for example. If it is judged that the transfer command has been issued (Yes in step S35), a message concerning the operation control information written in the RAM 343, such as changes from the previous version of the operation control information, is displayed on a display device 344 (step S31).

Next, it is judged whether the transfer enable signal has been transmitted (step S39). The transfer enable signal is generated when the operator, who has decided to update the operation control information after verifying the message displayed on the display device 344, presses a specified key of the input device 327. If it is judged that transfer of the operation control information has been enabled (Yes in step S39), the operation control information written in the RAM 343 is transferred to individual EEPROMs 323 of the machine control block 32 (step S41).

It is possible to update the operation control information stored in the EEPROMs 323 of the machine control block 32 in an efficient manner in the operation control information update system 60 of the third embodiment described above since the existing operation control information is updated by transmitting the upgrade version of the operation control information from the system control center to the photographic processing machine 30 in a manner similar to the first embodiment. Further, the operation control information can be updated whenever it is convenient, because the operation control information stored in the RAM 343 of the information control block 34 is transferred to the individual EEPROMs 323 when the operator give a transfer command by pressing a specified key of the input device 327. Moreover, the operator can choose not to update the operation control information if he, or she, thinks it is not necessary to do so. This is because the operator enables transfer of the new operation control information after verifying the contents of changes to the existing operation control information displayed on the display device 344.

Figure 7:
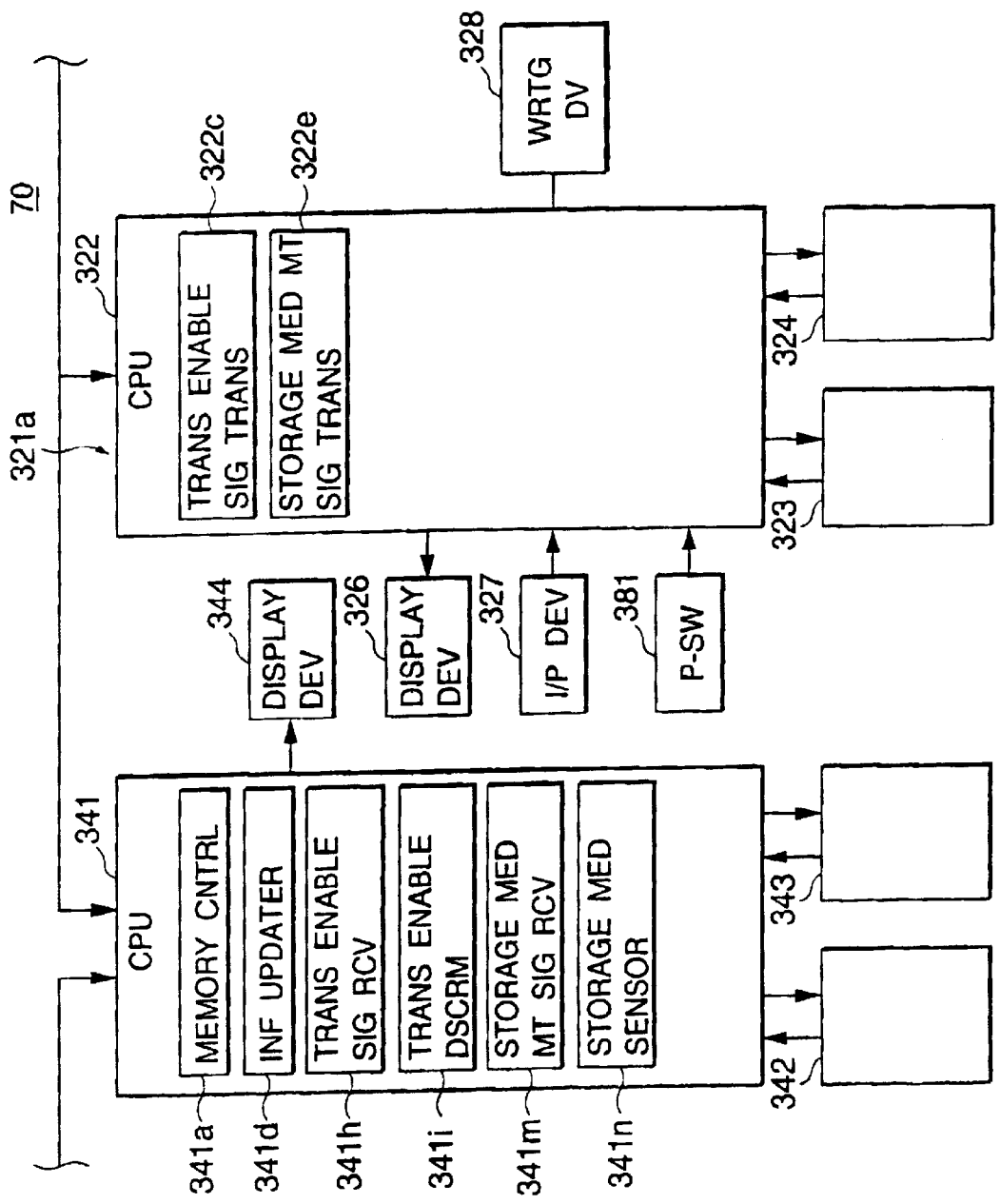
FIG. 7 is a block diagram showing part of an operation control information update system employing a processing apparatus according to a fourth embodiment of the invention.

FIG. 7 is a block diagram showing part of an operation control information update system 70 employing a processing apparatus (photographic processing machine 30) according to a fourth embodiment of the invention, in which elements identical or equivalent to those included in the operation control information update system 10 of the first embodiment are designated by the same reference numerals and a detailed description of such elements is omitted.

What is characteristic of the operation control information update system 70 of the fourth embodiment is that the operation control information is updated by transferring its upgrade version which has been stored in a RAM 343 of an information control block 34 to a machine control block 32 when the operation control information stored in the RAM 343 is copied onto an external storage medium, such as a floppy disk. The photographic processing machine 30 of this operation control information update system 70 is so constructed that an external storage medium like a floppy disk can be loaded into a first controller 321a of the machine control block 32 and a writing device 328 for recording information on the external storage medium is connected to the first controller 321a. A CPU 322 of the first controller 321a incorporates, besides the function of the earlier-described transfer enable signal transmitter 322c, an additional function as a storage medium mount signal transmitter 322e which transmits a storage medium mount signal requesting a transfer of the operation control information from the information control block 24 to the machine control block 32 when the external storage medium has been loaded into the writing device 328.

On the other hand, a CPU 341 of the information control block 34 incorporates, besides the functions of the earlier-described memory controller 341a, information updater 341d, transfer enable signal receiver 341h and transfer enable discriminator 341i, additional functions as a storage medium mount signal receiver 341m which receives the storage medium mount signal fed from the storage medium mount signal transmitter 322e and as a storage medium sensor 341n which judges whether the storage medium mount signal has been received.

Figure 8:
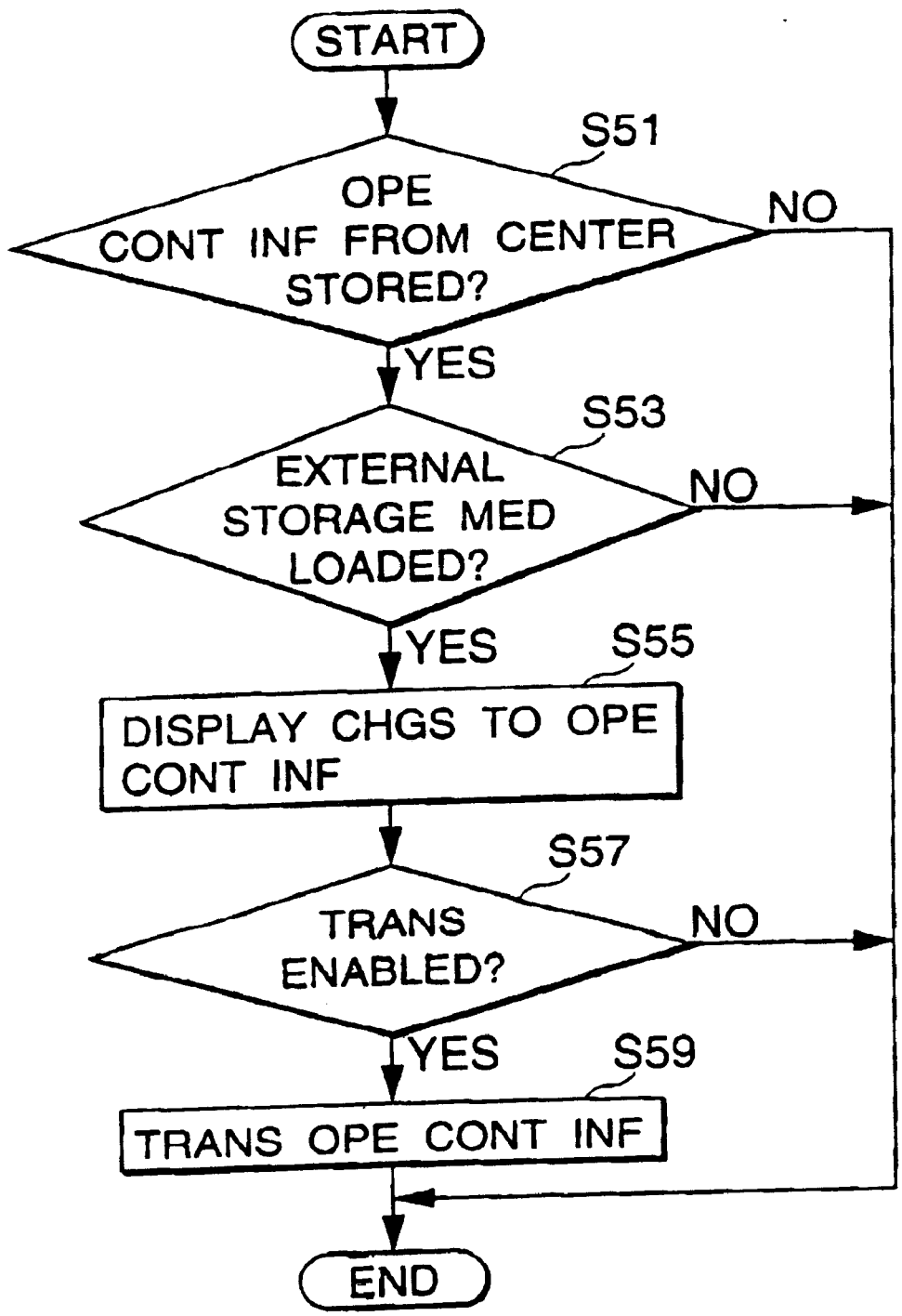
FIG. 8 is a flowchart depicting the operation of the processing apparatus employed in the operation control information update system of FIG. 7.

Operation of the operation control information update system 70 thus constructed is now described with reference to the flowchart of FIG. 8.

First, it is judged whether any operation control information transmitted from the operation control information transmitting apparatus 20 in the system control center has been written into the RAM 343 of the information control block 34 (step S51). If it is judged that the operation control information has been written into the RAM 343 (Yes in step S51), a further judgment is made as to whether an external storage medium has been loaded into the writing device 328 (step S53). If it is judged that the external storage medium has been loaded into the writing device 328 (Yes in step S53), a message concerning the operation control information written in the RAM 343, such as changes from the previous version of the operation control information, is displayed on a display device 344 (step S55).

Next, it is judged whether the transfer enable signal has been transmitted (step S57). The transfer enable signal is generated when the operator, who has decided to update the operation control information after verifying the message displayed on the display device 344, presses a specified key of an input device 327. If it is judged that transfer of the operation control information has been enabled (Yes in step S57), the operation control information written in the RAM 343 is transferred to individual EEPROMs 323 of the machine control block 32 (step S59). In this embodiment the updated operation control information in the EEPROMs 323 is copied onto the external storage medium after the operation control information in the individual EEPROMs 323 has been updated. As an alternative, the operation control information may be copied onto the external storage medium at the same time as the operation control information is transferred to the EEPROMs 323. The external storage medium on which the updated operation control information has been written is used for updating the operation control information stored in the machine control block 32 of other photographic processing machines, for instance.

It is possible to update the operation control information stored in the EEPROMs 323 of the machine control block 32 in an efficient manner in the operation control information update system 70 of the fourth embodiment described above since the existing operation control information is updated by transmitting the upgrade version of the operation control information from the system control center to the photographic processing machine 30 in a manner similar to the first embodiment. Further, the operation control information can be updated whenever it is convenient, because the operation control information stored in the RAM 343 of the information control block 34 is transferred to the individual EEPROMs 323 when the operation control information is copied onto the external storage medium. Moreover, the operator can choose not to update the operation control information if he, or she, thinks it is not necessary to do so. This is because the operator enables transfer of the new operation control information after verifying the contents of changes to the existing operation control information displayed on the display device 344.

Although the writing device 328 is connected to the first controller 321a in the fourth embodiment described above, it may be connected to the information control block 34.

Figure 9:
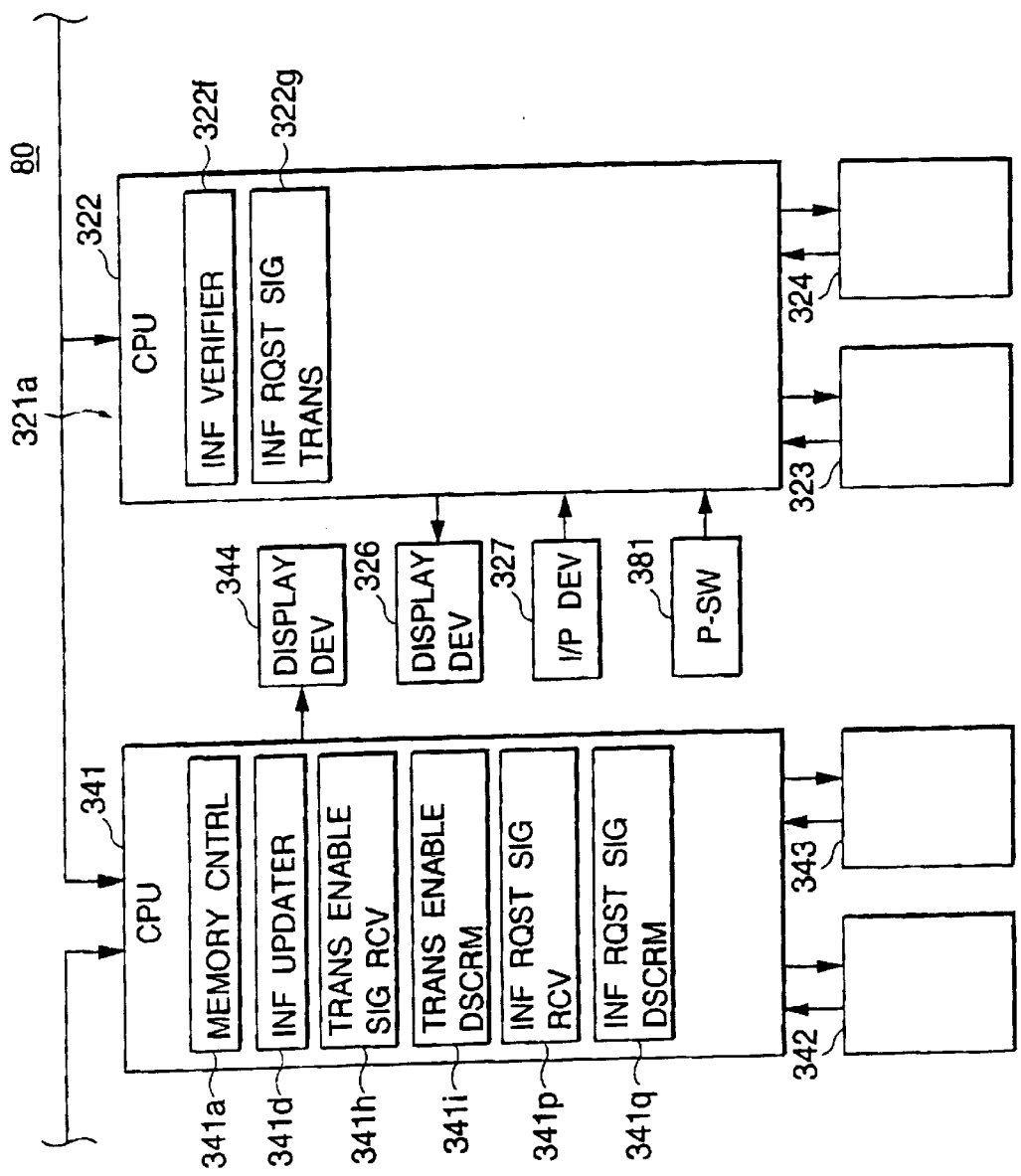
FIG. 9 is a block diagram showing part of an operation control information update system employing a processing apparatus according to a fifth embodiment of the invention.

FIG. 9 is a block diagram showing part of an operation control information update system 80 employing a processing apparatus (photographic processing machine 30) according to a fifth embodiment of the invention, in which elements identical or equivalent to those included in the operation control information update system 10 of the first embodiment are designated by the same reference numerals and a detailed description of such elements is omitted.

What is characteristic of the operation control information update system 80 of the fifth embodiment is that the operation control information is loaded into individual EEPROMs 323 by transferring the same which has been stored in a RAM 343 of an information control block 34 to a machine control block 32 in cases where one or both of the EEPROMs 323 have been replaced, for instance, and the EEPROMs 323 do not store the correct operation control information, or any operation control information at all. necessary for controlling the photographic processing machine 30.

In this operation control information update system 80 a CPU 322 of a first controller 321a incorporates, besides the function of the earlier-described transfer enable signal transmitter 322c, additional functional elements including an information verifier 322f which ascertains whether or not the appropriate operation control information is stored in the EEPROMs 323 of the machine control block 32, and an information request signal transmitter 322g which transmits an information request signal requesting the operation control information when it is not stored in the EEPROMs 323.

On the other band, a CPU 341 of the information control block 34 incorporates, besides the functions of the earlier-described memory controller 341a, information updater 341d, transfer enable signal receiver 341h and transfer enable discriminator 341i, additional functions as an information request signal receiver 341p which receives the information request signal fed from the information request signal transmitter 322g and as an information request signal discriminator 341q which judges whether the information request signal has been received.

Figure 10:
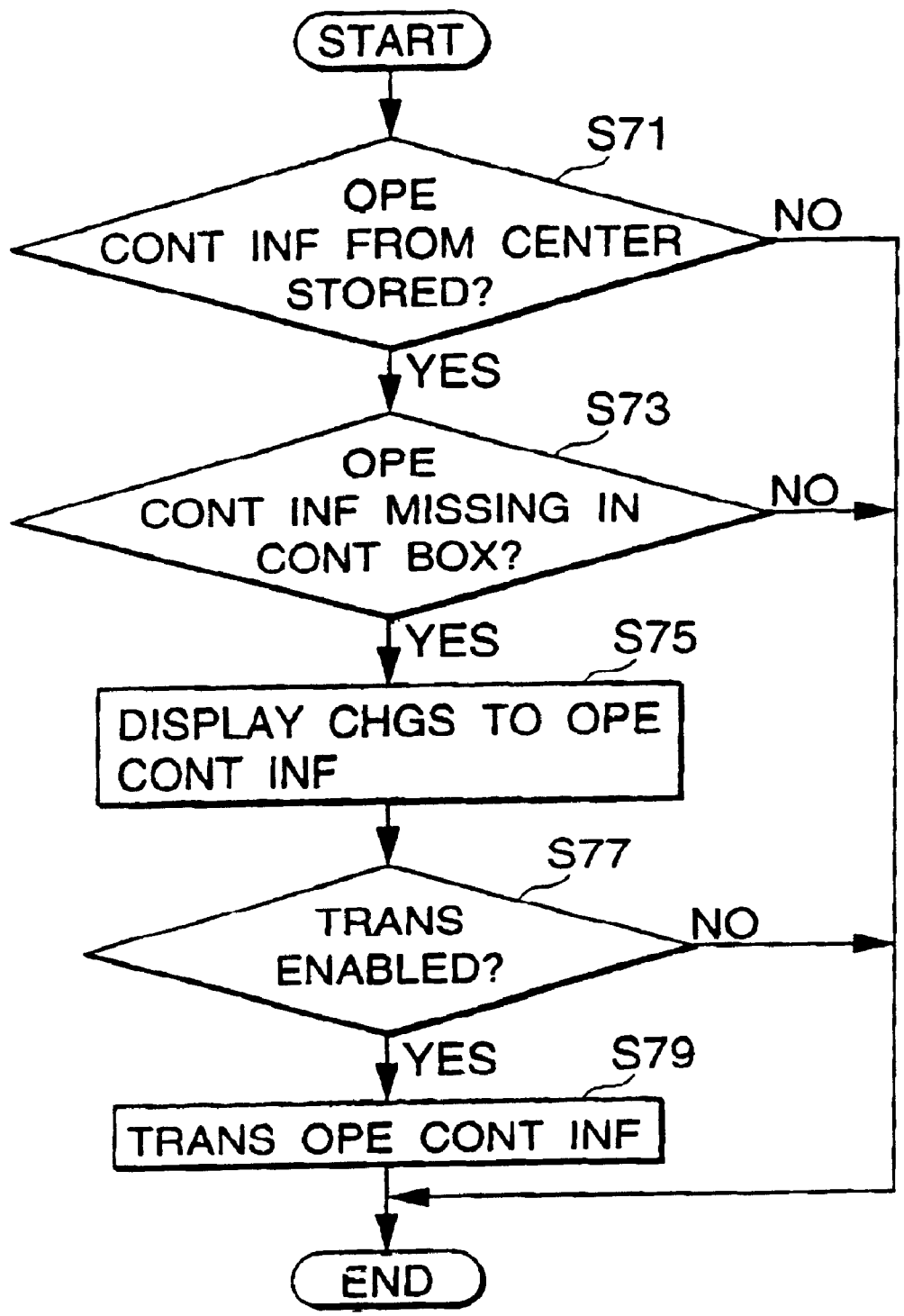
FIG. 10 is a flowchart depicting the operation of the processing apparatus employed in the operation control information update system of FIG. 9.

Operation of the operation control information update system 80 thus constructed is now described with reference to the flowchart of FIG. 10.

First, it is judged whether any operation control information transmitted from the operation control information transmitting apparatus 20 in the system control center has been written into the RAM 348 of the information control block 34 (step S71). If it is judged that the operation control information has been written into the RAM 343 (Yes in step S71), a further judgment is made as to whether the operation control information is absent or destroyed in the EEPROMs 323 of the machine control block 32 (step S73). If it is judged that the operation control information is absent or destroyed in the EEPROMs 323 (Yes in step S73), a message concerning the operation control information written in the RAM 343, such as changes from the previous version of the operation control information, is displayed on a display device 344 (step S75).

Next, it is judged whether the transfer enable signal has been transmitted (step S77). The transfer enable signal is generated when the operator, who has decided to load or update the operation control information after verifying the message displayed on the display device 344, presses a specified key of an input device 327. If it is judged that transfer of the operation control information has been enabled (Yes in step S77), the operation control information written in the RAM 343 is transferred to the individual EEPROMs 323 of the machine control block 32 (step S79).

It is possible to update the operation control information in the EEPROMs 323 of the machine control block 32 in an efficient manner in the operation control information update system 80 of the fifth embodiment described above since the operation control information is updated by transmitting it from the system control center to the photographic processing machine 30 in a manner similar to the first embodiment. Furthermore, the operator can choose not to update the operation control information if he, or she, thinks it is not necessary to do so. This is because the operator enables transfer of the new operation control information after verifying the contents of changes to the existing operation control information displayed on the display device 344.

Although the processing apparatus is the photographic processing machine 30 in the foregoing embodiments, the invention is applicable to any processing apparatus if it is of a type performs a specified operation in accordance with the operation control information stored in the EEPROMs 323 of the machine control block 32. The processing apparatus of any of the foregoing embodiments may be modified such that the processing apparatus further comprises means for mode selection and has the capability to perform all the functions included in the first to fifth embodiments, thereby allowing the operator to select a desired function on a menu presented on the display device 326.

Although various signals are transmitted from the machine control block 32 and received by the information control block 34 in any of the foregoing embodiments, it is possible to modify their system construction in such a manner that flags are set in the machine control block 32 and the machine control block 32 reads such flags.

Although updating of the operation control information is permitted when the power supply 38 has been turned on, when the operator has given a transfer command, and when an external storage medium has been loaded into the writing device 328 in the second to fourth embodiments described above, respectively, these embodiments may be modified to permit the updating when some other operation has been accomplished.

Although the present invention has been fully described by way of example with reference to the accompanying drawings, it is to be understood that various changes and modifications will be apparent to those skilled in the art. Therefore, unless otherwise such changes and modifications depart from the scope of the present invention defined in the following section, they should be considered as being included therein.

What is claimed is:

1. A photographic processing apparatus comprising:
   an exposure processor;
   a development processor:
   an apparatus controller including a control information memory for storing operation control information enabling the photographic processing apparatus to perform a specified operation; and
   an information controller including:
      an update information memory for holding operation control information transmitted from a control center, and
      an information updater for updating the operation control information currently stored in the control information memory by transferring the operation control information held in the update information memory to the control information memory.

2. The photographic processing apparatus according to claim 1, wherein the information updater transfers the operation control information held in the update information memory to the control information memory on condition that transmission of the operation control information from the control center has been completed.

3. The photographic processing apparatus according to claim 1, wherein the information updater transfers the operation control information held in the update information memory to the control information memory on condition that a prerequisite for information updating have been satisfied.

4. The photographic processing apparatus according to claim 3, wherein the prerequisite for information updating is a presence of a transfer command given by an operator.

5. The photographic processing apparatus according to claim 3, further comprising:
   first controller for receivable accommodating an external storage medium; and
   a writing device for writing operation control information on said external storage medium when loaded in the first controller of the photographic processing apparatus, and the prerequisite for information updating is that the external storage medium has been loaded in the photographic processing device and the writing device has become ready to write on the external storage medium.

6. The photographic processing apparatus according claim 1, further comprising a display unit for displaying information on the operation control information held in the update information memory.

7. The photographic processing apparatus according to claim 6, further comprising an update enabling device actuatable by an operator of the photographic processing device for selectively enabling transfer of the operation control information held in the update information memory and displayed on the display unit to the control information memory.

8. The photographic processing apparatus according to claim 3, further comprising a power supply for providing electric power to the photographic processing apparatus and the prerequisite for information updating is that the power supply has been activated.

9. The photographic processing apparatus according to claim 3, wherein the prerequisite for information updating is that the operation control information is not stored in the control information memory.

10. An operation control information update system comprising:
    an operation control information transmitting apparatus for transmitting an operation control information; and
    a photographic processing apparatus for receiving the operation control information from the operation control information transmitting apparatus, the photographic processing apparatus including:
       an exposure processor;
       a development processor;
       an apparatus controller having a control information memory for storing the operation control information, enabling the processing apparatus to perform a specified operation; and
    an information controller having:
       an update information memory for holding the operation control information transmitted from the operation control information transmitting apparatus, and
       an information updater for updating the operation control information currently stored in the control information memory by transferring the operation control information held in the update information memory to the control information memory.

11. The operation control information update system according to claim 10, wherein the information updater transfers the operation control information held in the update information memory to the control information memory on condition that transmission of the operation control information from the operation control information transmitting apparatus has been completed.

12. The operation control information update system according to claim 10, wherein the information updater transfers the operation control information held in the update information memory to the control information memory on condition that a prerequisite for information updating have been satisfied.

13. The operation control information update system according to claim 12, further comprising a power supply for providing electric power to the processing apparatus and the prerequisite for information updating is that the power supply has been activated.

14. The operation control information update system according to claim 12, wherein the prerequisite for information updating is a presence of a transfer command given by an operator.

15. The operation control information update system according to claim 12, further comprising:
   a first controller for receivably accommodating an external storage medium; and
   a writing device for writing operation control information on said external storage medium when loaded in the first controller of the photographic processing apparatus, and the prerequisite for information updating is that the external storage medium has been loaded in the photographic processing device and the writing device has become ready to write on the external storage medium.

16. The operation control information update system according to claim 12, wherein the prerequisite for information updating is that the operation control information is not stored in the control information memory.

17. The operation control information update system according to one of claims 10 through 16, further comprising a display unit for displaying information on the operation control information held in the update information memory.

18. The operation control information update system according to claim 17, further comprising an update enabling device actuatable by an operator of the photographic processing device for selectively enabling transfer of the operation control information held in the update information memory and displayed on the display unit to the control information memory.

19. A processing apparatus comprising:
   an apparatus controller including a control information memory for storing operation control information enabling the processing apparatus to perform a specified operation; and
   an information controller including:
      an update information memory for holding operation control information transmitted from a control center, and
      an information updater for updating the operation control information currently stored in the control information memory by transferring the operation control information held in the update information memory to the control information memory; and
   a power supply for providing electric power to the processing apparatus, the information updater transferring the operation control information held in the update information memory to the control information memory on condition that the power supply is changed from an off state to an on state.

20. A processing apparatus comprising:
   an apparatus controller including a control information memory for storing operation control information enabling the processing apparatus to perform a specified operation; and
   an information controller including:
      an update information memory for holding operation control information transmitted from a control center, and
      an information updater for updating the operation control information currently stored in the control information memory by transferring the operation control information held in the update information memory to the control information memory the information updater transferring operation control information held in the update information memory on condition that said processing apparatus is in an initial start-up condition and the control information memory contains no previously stored operation control information.

* * * * *